E. P. DICKEY.
WHEEL.
APPLICATION FILED APR. 21, 1919.
1,394,477. Patented Oct. 18, 1921.
2 SHEETS—SHEET 1.
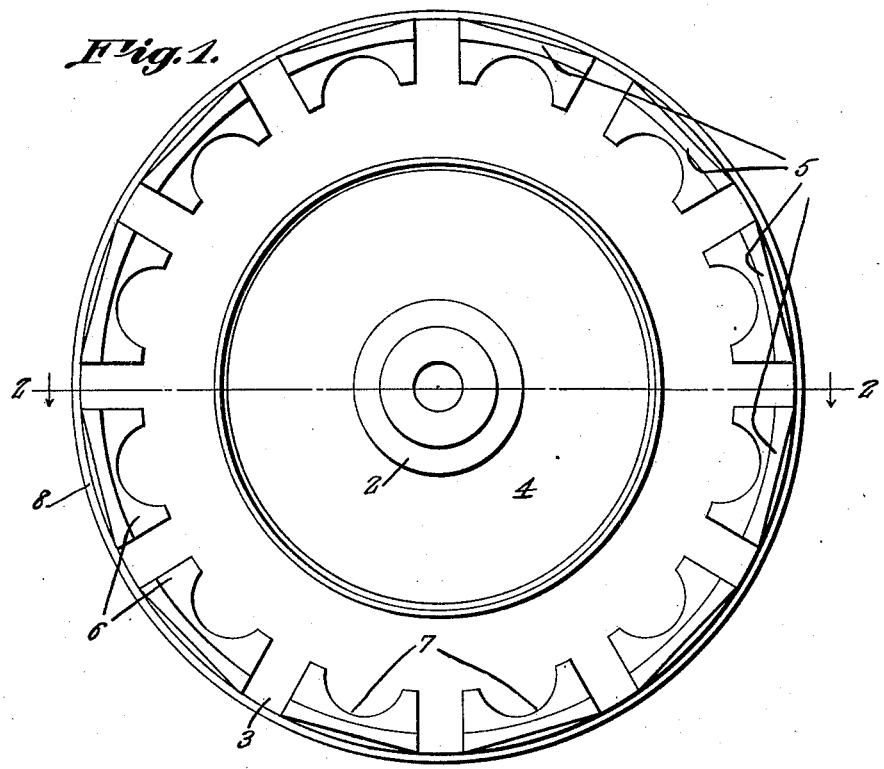
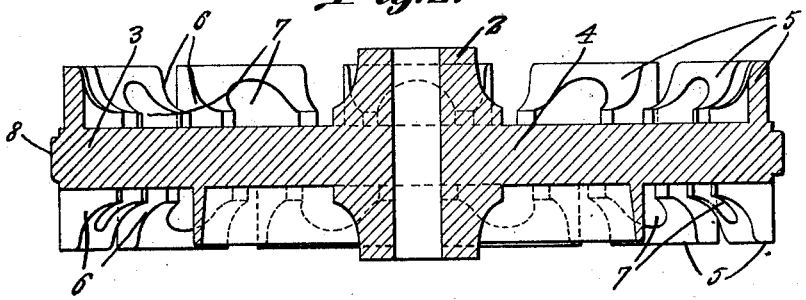
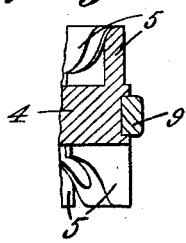
E. P. Dickey, Inventor

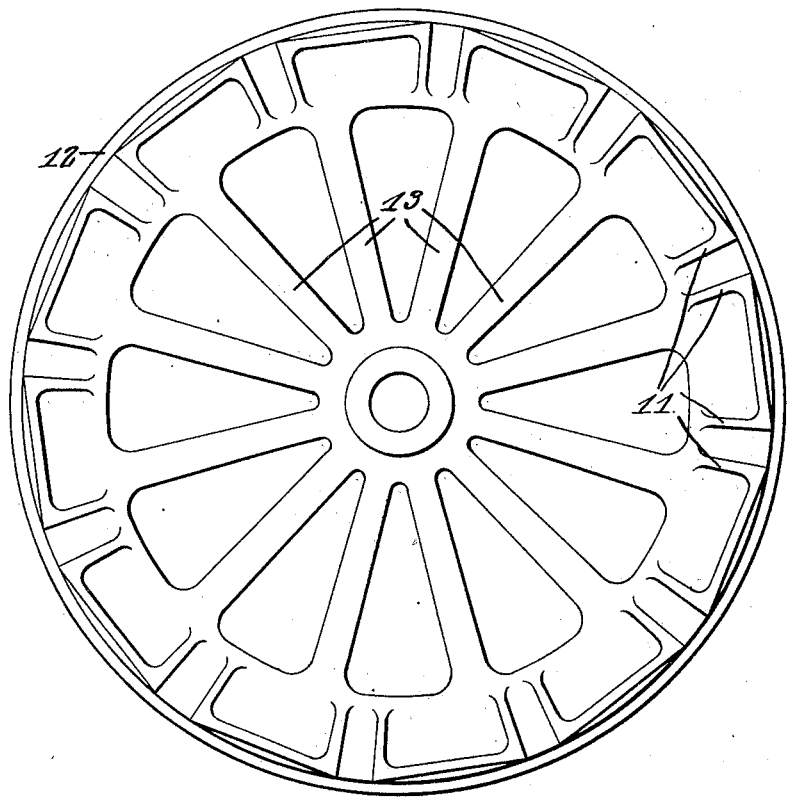
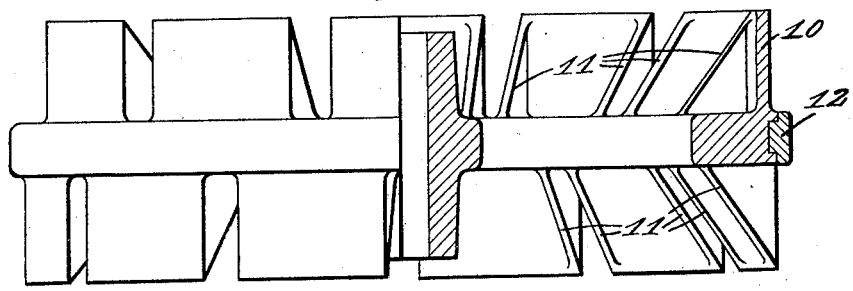

UNITED STATES PATENT OFFICE.

EDWARD PARK DICKEY, OF HARVEY, ILLINOIS.

WHEEL.

1,394,477. Specification of Letters Patent. Patented Oct. 18, 1921.

Application filed April 21, 1919. Serial No. 291,501.

*To all whom it may concern:*

Be it known that I, EDWARD PARK DICKEY, a citizen of the United States, residing at Harvey, in the county of Cook and State of Illinois, have invented a new and useful Wheel, of which the following is a specification.

This invention relates to improvements in wheels, the primary object of the invention being to provide a wheel which is equally well adapted for use as a tractor wheel as well as a truck wheel on rough and unimproved roadways, farm lands and also on improved streets and highways.

A further object of the invention is to provide a reinforced wheel of the character set forth which is extremely simple in construction, inexpensive to manufacture and maintain, and very practical and efficient in use.

With the foregoing and other objects in view, which will appear as the description proceeds, the invention consists in the novel features of construction and combination of parts which will be more fully described hereinafter and particularly pointed out in the claims.

A wheel having a tread that is first adapted for sustaining the load of and propelling a vehicle or tractor on a hard road surface without injury to the road is wholly inefficient for either support or propulsion upon agricultural or other soft surfaces, and a tread suitable for the latter class of surfaces is injurious to hard surfaces and uneconomical in power consumption when used thereon.

The present invention solves the problem of providing a wheel suitable for all kinds of surfaces, by constructing the rim of the wheel with a primary tread that alone comes into bearing upon ordinary surfaces of travel, and a secondary tread that comes into bearing for sustaining the load and increasing traction when the primary tread penetrates abnormally, and in which the construction is simple in design, strong in structure, easy to produce, and acts as well in rearward travel as in forward travel, so that the wheel is reversible.

Accordingly, the invention proceeds upon the principle of providing a wheel with a circular primary tread and one or more (preferably two) secondary treads disposed laterally to and radially nearer the center than the primary tread, and composed of side lugs that constitute symmetrical sections of a regular polygon, separated at the angles of the polygon to provide unobstructed radial soil breaking recesses, defined by forwardly and rearwardly presented substantially radial traction shoulders alternating with interrupted load bearing surfaces disposed as chords of the circumference of the primary tread; the lugs constituting the secondary tread, or treads, being preferably constructed with sustaining brackets coinciding with the traction shoulders to enlarge the surfaces thereof.

An illustrative embodiment of the invention will now be described in detail.

In the drawings accompanying and forming part of this specification,

Figure 1 is a side elevation illustrating one form of my improved wheel;

Fig. 2 is a cross section taken on the line 2—2 of Fig. 1;

Fig. 3 is a fragmentary view illustrating a modified form of rim;

Fig. 4 is a side elevation of a wheel, illustrating a different form of bracket from that shown in Figs. 1 and 2; and Fig. 5 is a partly sectional end view of the wheel shown in Fig. 4.

The same characters of reference designate the same parts in the different figures of the drawings.

Referring to the drawings, and more particularly to Figs. 1 and 2, the numeral 2 designates a hub and 3 a rim. The rim may be connected to the hub by any suitable arrangement of spokes or by a solid web, such as the web 4 shown herein. The rim 3 is provided at its opposite sides with a plurality of tractor lugs 5, the lugs at one side of the rim being preferably located in staggered relation to those at the opposite side thereof. For the purpose of reinforcing the lugs, I have provided a series of angle brackets 6 supporting the lugs on the rim, the brackets being preferably cast integral with said rim and lugs, although, if preferred, they may be made separately and secured thereto in any suitable manner. By staggering the brackets at opposite sides of the rim these brackets form a reinforcement not only for the lugs, but also serve to materially stiffen and reinforce the rim itself, since there is no point around its circumference where the rim is without the support of one of the brackets at one side or the other, which would not be the case if the brackets at the opposite sides of the rim were in alinement. The spaces between the lugs prevent the ground under the wheel from becoming uniformly packed, but rather affords an undisturbed area in the track of the wheel which will permit the action of the atmosphere and the moisture in the ground to take place in a more natural and unrestricted manner, and also afford an irregular bearing surface of varying density tending to prevent the wheel from slipping. The brackets may be cut away as shown at 7 for the purpose of lightening the wheel.

The wheel so far described is primarily a tractor wheel, and for the purpose of adapting it for use equally well on improved streets, the rim 3 may be provided with a circumferentially raised portion 8 extending beyond the surface of the lugs radially of the wheel, as shown in Fig. 2. When, however, it is desired to provide a wheel having a resilient or flexible tire, a circumferential groove may be formed in the rim and a tire 9 inserted therein, as shown in Fig. 3, or the tire may be secured on a suitable steel rim and pressed on to the rim of the wheel.

In Figs. 4 and 5 the lugs 10 are of substantially the same form as those shown in Figs. 1 to 3. The brackets 11, however, are illustrated as formed of a triangular shaped web at each end of each of the lugs. It is obvious, of course, that in either form of the wheel shown the supporting members or brackets might take the form of supplementary rims applied to the two outer edges of the side lugs, as well as many other forms all of which I regard as clearly within the purview of my invention. In the form shown in Fig. 5, the raised portion or tire 12, instead of being formed integral with the rim, is made separately and seated in a circumferential groove formed in the rim. The wheel may be formed with spokes 13 connecting the rim and hub or may have a web formation similar to that of Fig. 1.

In both forms of the device illustrated herein, it will be observed that the outer side of the lugs is in a plane at right angles to the axis of rotation of the hub. In other words, the outer side of the lug forms a chord of an arc of the circumference of the wheel, whereby a better gripping edge is given to the lug than if it were curved to correspond with the circumference of the wheel. It will be obvious, of course, that if it is desired to still further enhance the gripping quality of the lugs they may be provided with grooves in their surfaces, or openings passing through the lugs, or projections formed on the surface thereof, which it is not considered necessary to illustrate herein, since all of such expedients are well known.

It will thus be seen that I have provided what may be termed an "all-purpose wheel"; that is to say, a wheel that is equally well adapted for use as a tractor wheel on rough roads and as an ordinary wheel on smooth or improved roads, the usefulness of which is believed to be self-evident, and while I have described in detail the structure herein illustrated, it is to be understood that I do not thereby limit my invention to the precise features of construction shown, as I am aware that many modifications and mechanical changes may be made therein without departing from the spirit and scope of the invention as set forth in the appended claims.

Having thus described my invention, what I claim is:

1. A wheel rim comprising a circular primary tread and a secondary tread disposed laterally to and radially nearer the center than the primary tread; said secondary tread being composed of symmetrical sections of a regular polygon separated at the angles thereof to provide unobstructed soil breaking recesses and positioned to provide interrupted load bearing surfaces as chords of the primary tread and forwardly and rearwardly presented traction shoulders in planes substantially radial to said circumference.

2. A wheel rim comprising a circular primary tread and a secondary tread disposed laterally to and radially nearer the center than the primary tread; said secondary tread being composed of symmetrical sections of a regular polygon separated at the angles thereof to provide unobstructed soil breaking recesses and positioned to provide interrupted load bearing surfaces as chords of the primary tread and forwardly and rearwardly presented traction shoulders in planes substantially radial to said circumference; the sections of the secondary tread having sustaining brackets coinciding with their substantially radial shoulders and enlarging the traction surfaces thereof.

In testimony that I claim the foregoing as my own, I have hereto affixed my signature in the presence of two witnesses.

EDWARD PARK DICKEY.

Witnesses:
L. M. RAND,
P. M. GARDNER.